(12) United States Patent
Shirai

(10) Patent No.: US 11,040,750 B2
(45) Date of Patent: Jun. 22, 2021

(54) DETECTION DEVICE AND CONTROL SYSTEM

(71) Applicant: SHIMANO Inc., Sakai (JP)

(72) Inventor: Toyoto Shirai, Sakai (JP)

(73) Assignee: Shimano Inc., Sakai (JP)

( * ) Notice: Subject to any disclaimer, the term of this patent is extended or adjusted under 35 U.S.C. 154(b) by 94 days.

(21) Appl. No.: 16/182,373

(22) Filed: Nov. 6, 2018

(65) Prior Publication Data

US 2019/0185099 A1 Jun. 20, 2019

(30) Foreign Application Priority Data

Dec. 15, 2017 (JP) .............................. JP2017-240319

(51) Int. Cl.
*B62J 99/00* (2020.01)
*B62J 3/00* (2020.01)
*B62J 1/08* (2006.01)
*B62K 25/00* (2006.01)
*B62M 25/00* (2006.01)
*B62M 6/80* (2010.01)
*B60T 8/17* (2006.01)
*B62J 6/00* (2020.01)
*G01S 13/931* (2020.01)
(Continued)

(52) U.S. Cl.
CPC ............. *B62J 99/00* (2013.01); *B60Q 9/00* (2013.01); *B60T 8/1706* (2013.01); *B62J 1/08* (2013.01); *B62J 3/00* (2013.01); *B62J 6/00* (2013.01); *B62K 25/00* (2013.01); *B62M 6/80* (2013.01); *B62M 25/00* (2013.01); *G01S 13/931* (2013.01); *B60T 2210/32* (2013.01); *B62J 45/20* (2020.02); *B62J 45/40* (2020.02); *B62J 2001/085* (2013.01); *G01S 2013/9323* (2020.01); *G01S 2013/9327* (2020.01); *H04L 67/12* (2013.01)

(58) Field of Classification Search
USPC .......................................................... 701/37
See application file for complete search history.

(56) References Cited

U.S. PATENT DOCUMENTS 8,286,982 B2 10/2012 Plantet et al.
8,827,515 B2 9/2014 Tsai et al.
(Continued)

FOREIGN PATENT DOCUMENTS

| CN | 203681462 U | 7/2014 |
|---|---|---|
| CN | 104522927 A | 4/2015 |

(Continued)

OTHER PUBLICATIONS

Eurocopter Tiger, German Wikipedia Website, Available Online at https://deacademic.com/dic.nsf/dewiki/414112, Available as early as Apr. 30, 2004, Submitted with description of product from https://enacademic.com/dic.nsf/enwiki/186211 as explanation of relevance, 35 pages.

*Primary Examiner* — Aniss Chad
*Assistant Examiner* — Mahmoud M Kazimi
(74) *Attorney, Agent, or Firm* — Alleman Hall Creasman & Tuttle LLP

(57) ABSTRACT

A detection device includes sensor device configured to obtain environmental information about surroundings of a small vehicle, an output unit outputting the environmental information to a control device of the small vehicle, and a mount configured to be attached to a rider of the small vehicle so as to hold the sensor device and the output device.

12 Claims, 10 Drawing Sheets

(51) Int. Cl.
   *B60Q 9/00*   (2006.01)
   *B62J 45/40*  (2020.01)
   *H04L 29/08*      (2006.01)
   *B62J 45/20*      (2020.01)

(56) References Cited

U.S. PATENT DOCUMENTS

| | | |
|---|---|---|
| 10,598,764 B2 * | 3/2020 | Josefsberg .............. H03L 7/185 |
| 2013/0311075 A1 | 11/2013 | Tran et al. |
| 2014/0169011 A1 * | 6/2014 | Tsai .......................... B62J 6/05 |
| | | 362/464 |
| 2014/0316671 A1 | 10/2014 | Okamoto |
| 2016/0339990 A1 | 11/2016 | Walthert et al. |
| 2017/0295319 A1 | 10/2017 | Komemushi et al. |
| 2019/0098953 A1 * | 4/2019 | Strickland .......... G06K 9/00805 |
| 2019/0315373 A1 * | 10/2019 | Kondo .................... G08G 1/16 |

FOREIGN PATENT DOCUMENTS

| | | |
|---|---|---|
| JP | H09166205 A | 6/1997 |
| JP | 2015084691 A | 5/2015 |
| JP | 2017188849 A | 10/2017 |

\* cited by examiner

DETECTION DEVICE AND CONTROL SYSTEM

TECHNICAL FIELD

The present invention relates to a detection device and a control system.

BACKGROUND ART

In recent years, a technique of automatically controlling components of small vehicles such as bicycles has been developed. For example, Patent Literature 1 discloses automatic control of a suspension based on detection results of a sensor device that is arranged so as to rotate in response to movement of steering of a bicycle. Patent Literature 1 also discloses an ultrasonic sensor, an infrared sensor, and a radar sensor as examples of the sensor device. Patent Literature 1 further discloses a handlebar, a fork, and a mudguard attached to the fork of the bicycle as examples of an attachment position of the sensor device.

PRIOR ART LITERATURE

Patent Literature

Patent Literature 1
US 2016/0339990 A1

SUMMARY OF INVENTION

Technical Problem

As disclosed in Patent Literature 1, when the sensor device is attached to the handlebar, the fork, or the mudguard attached to the fork in a small vehicle, the sensor device can obtain only information in a limited range with respect to the traveling direction of the small vehicle. Accordingly, when the traveling direction of the small vehicle is suddenly changed as in the case of traveling along a turn-back corner or on a place with a sudden change in a gradient, for example, there is the risk that the sensor device cannot properly obtain information on a position after the change in the traveling direction.

The present invention has been made to solve the above-mentioned problem, and an object thereof is to provide a detection device and a control system capable of properly obtaining pieces of information on places in the traveling direction of a small vehicle including not only a place in the current traveling direction but also places in directions other than the current traveling direction.

Solution to Problem

To solve the above-mentioned problem and achieve the object, in accordance with a first aspect of the present disclosure, a detection device includes: a sensor device configured to obtain environmental information about surroundings of a small vehicle; an output device configured to output the environmental information to a control device of the small vehicle; and a mount to be attached to a rider of the small vehicle so as to hold the sensor device and the output device.

According to the first aspect, pieces of information on places in the traveling direction of the small vehicle including not only a place in the current traveling direction but also places in directions other than the current traveling direction can be obtained, thereby providing a detection device capable of coping with a turn-back corner and a sudden change in a gradient. That is to say, according to the first aspect, even when the traveling direction of the small vehicle is suddenly changed as in the case of traveling along the turn-back corner or on a place with the sudden change in the gradient, the information on the place in the traveling direction of the small vehicle can be properly obtained.

In accordance with a second aspect of the present disclosure, in the detection device according to the first aspect, the mount is configured to be attached to a helmet or eyewear of the rider.

According to the second aspect, information on the sight line of the rider can be obtained.

To solve the above-mentioned problem and achieve the object, in accordance with a third aspect of the present disclosure, a detection device includes: a sensor device configured to obtain environmental information about surroundings of a small vehicle; an output device outputting the environmental information to a control device of the small vehicle; a controller configured to control the sensor device so as to change a range of the surroundings to be obtained in response to at least one of a movement of eyes of a rider of the small vehicle and a movement of a head of the rider; and a mount to be attached to a frame of the small vehicle.

According to the third aspect, a detection device capable of coping with a turn-back corner and a sudden change in a gradient can be provided.

In accordance with a fourth aspect of the present disclosure, in the detection device according to any one of the first to third aspects, the sensor device obtains the environmental information by receiving an electromagnetic wave reflected by a detection object in the surroundings, and a frequency of the electromagnetic wave is equal to or more than 30 GHz.

According to the fourth aspect, a detection device capable of coping with a turn-back corner and a sudden change in a gradient can be provided.

In accordance with a fifth aspect of the present disclosure, in the detection device according to the fourth aspect, the sensor device outputs an electromagnetic wave toward the surroundings, and receives, as the electromagnetic wave reflected by a detection object, a reflected wave of the output electromagnetic wave from the detection object.

According to the fifth aspect, a processing load of the obtained environmental information can be reduced, thereby contributing to reduction in power consumption.

In accordance with a sixth aspect of the present disclosure, in the detection device according to any one of the first to fifth aspects, the output device outputs the environmental information to the control device of the small vehicle via wireless communication.

According to the sixth aspect, no electric wiring is required and arrangement and the like can therefore be made convenient.

In accordance with a seventh aspect of the present disclosure, in the detection device according to any one of the first to sixth aspects, the small vehicle is a saddle-type vehicle.

According to the seventh aspect, a detection device capable of coping with a turn-back corner and a sudden change in a gradient can be provided.

In accordance with an eighth aspect of the present disclosure, in the detection device according to the seventh aspect, the saddle-type vehicle is a human-power driving vehicle.

According to the eighth aspect, a detection device capable of coping with a turn-back corner and a sudden change in a gradient can be provided.

To solve the above-mentioned problem and achieve the object, in accordance with a ninth aspect of the present disclosure, a control system includes: the detection device according to any one of the first to eighth aspects; and the control device of the small vehicle.

According to the ninth aspect, control capable of coping with a turn-back corner and a sudden change in a gradient can be performed.

In accordance with a tenth aspect of the present disclosure, in the control system according to the ninth aspect, the control device includes a receiver configured to receive the environmental information from the output device via wireless communication.

According to the tenth aspect, no electric wiring is required and arrangement and the like can therefore be made convenient.

In accordance with an eleventh aspect of the present disclosure, in the control system according to the ninth or tenth aspect, the control device controls, based on the environmental information, at least one of a transmission of the small vehicle, a suspension of the small vehicle, an adjustable seat post of the small vehicle, a traveling assisting device which assists travel of the small vehicle, and a braking device of the small vehicle.

According to the eleventh aspect, various components can be controlled in accordance with a traveling environment, thereby enabling the rider to ride the small vehicle comfortably.

In accordance with a twelfth aspect of the present disclosure, the control system according to any one of the ninth to eleventh aspects further includes a notification device. The control device controls the notification device based on the environmental information.

According to the twelfth aspect, the possibility that the rider can ride the small vehicle safely can be increased.

In accordance with a thirteenth aspect of the present disclosure, in the control system according to the twelfth aspect, the notification device includes at least one of a cycle computer, eyewear, a smartphone, a tablet device, a smartwatch, a personal computer, a lamp, and a speaker.

According to the thirteenth aspect, the possibility that the rider can ride the small vehicle safely can be increased.

In accordance with a fourteenth aspect of the present disclosure, in the control system according to twelfth or thirteenth aspect, the notification device outputs at least any one of sound, light, and vibration.

According to the fourteenth aspect, the possibility that the rider can ride the small vehicle safely can be increased.

Advantageous Effects of Invention

According to the present invention, pieces of information on places ahead in the traveling direction of a small vehicle can be properly obtained even when the traveling direction of the small vehicle is suddenly changed.

DESCRIPTION OF EMBODIMENTS

Hereinafter, preferred embodiments of the present invention will be described in detail with reference to the accompanying drawings. The present invention is not limited by the embodiments. When there is a plurality of embodiments, the present invention encompasses combinations of the respective embodiments.

First Embodiment

Overall Configuration of Small Vehicle

Figure 1:
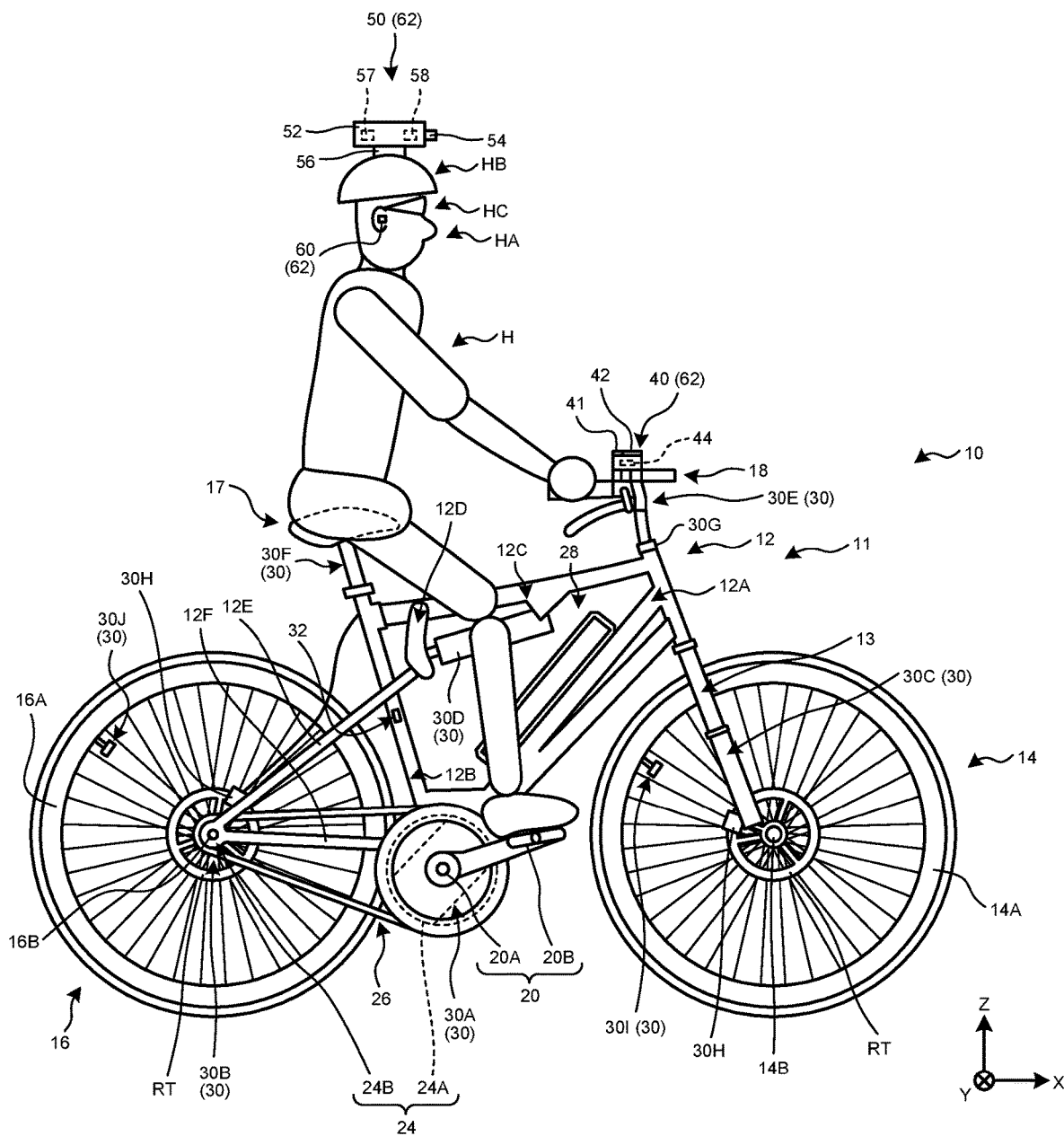
FIG. 1 is a front view schematically illustrating a small vehicle according to a first embodiment.

FIG. 1 is a schematic front view of a small vehicle according to a first embodiment. As illustrated in FIG. 1, the small vehicle 10 in the first embodiment is a vehicle that a rider H rides. In the first embodiment, the rider H drives the small vehicle 10. The small vehicle 10 is a bicycle, that is, a human-power driving vehicle, and includes a main body 11, a front wheel 14, a rear wheel 16, a saddle 17, a handlebar 18, a crank 20, a sprocket 24, a chain 26, a battery 28, components 30, a detector 32, and a control device 40. Attached to the rider H is a detection device 50 according to the first embodiment. Also attached to the rider H is a notification device 60. The control device 40, the detection device 50, and the notification device 60 configure a control system 62 in the first embodiment.

The small vehicle 10 according to the first embodiment is the human-power driving vehicle that the rider H drives with a driving force of human power but is not limited thereto and may be an automobile. To be more specific, the small vehicle 10 is an electric vehicle or a non-electric vehicle and may be a vehicle with an internal combustion engine as a driving source. The small vehicle 10 may have a desired number of wheels. When the small vehicle 10 is a vehicle with an internal combustion engine as the driving source for rotating the wheels, the small vehicle 10 does not include vehicles having four or more wheels. When the small vehicle 10 is an electric vehicle, the small vehicle 10 does not include vehicles having four or more wheels that require driver's license for traveling on public roads. That is to say, the small vehicle 10 may have the internal combustion engine if it is, for example, a two-wheel vehicle. The small vehicle 10 may be an electric four-wheel vehicle if it requires no driver's license for traveling on public roads. In the first embodiment, the size of the small vehicle 10 is smaller than those of passenger automobiles having four wheels but the desired size of small vehicle 10 may be applied. The small vehicle 10 may be a saddle-type vehicle. The saddle-type vehicle is a vehicle that the rider H bestrides a saddle for riding and examples thereof include human-power driving vehicles, motorcycles, motor tricycles, all-terrain vehicles (ATVs), and snowmobiles.

The main body 11 includes a frame 12 and a fork 13. The frame 12 has a head tube 12A, a seat tube 12B, a top tube 12C, a link 12D, a first swing arm 12E, and a second swing arm 12F. The head tube 12A supports the handlebar 18 and the fork 13 such that they are rotatable. The fork 13 supports the front wheel 14. The top tube 12C connects the head tube 12A and the seat tube 12B. The link 12D is rotatably supported on the seat tube 12B and the top tube 12C and connects a suspension 30D, which will be described later, and the first swing arm 12E. The first swing arm 12E is connected to the suspension 30D through the link 12D. The second swing arm 12F (chain stay) is rotatably supported on the first swing arm 12E and the seat tube 12B.

The front wheel 14 has a wheel 14A and a hub 14B. The front wheel 14 is supported on the fork 13 in a state of being rotatable with respect to the frame 12. The rear wheel 16 has a wheel 16A and a hub 16B. The rear wheel 16 is supported on the first swing arm 12E in a rotatable state.

The saddle 17 is connected to the seat tube 12B through an adjustable seat post 30F, which will be described later, and the rider H can sit on the saddle 17. The handlebar 18 is connected to the head tube 12A such that the rider H can grip it and perform a steering operation to change the traveling direction of the front wheel 14.

The crank 20 includes a crank shaft 20A, a right crank 20B, and a left crank (not illustrated). The crank shaft 20A is connected to the frame 12 in a state of being rotatable with respect to the frame 12. The right crank 20B and the left crank are coupled to the crank shaft 20A. The sprocket 24 includes a front sprocket 24A and a rear sprocket 24B. The front sprocket 24A is coupled to the right crank 20B. The rear sprocket 24B is coupled to the wheel 16A of the rear wheel 16. The chain 26 is wound around the front sprocket 24A and the rear sprocket 24B.

The crank 20 rotates with driving force of human power that the rider H applies to the small vehicle 10. The front sprocket 24A rotates together with the crank 20, and the rotation thereof is transmitted to the rear sprocket 24B with the chain 26. Thus, the rear sprocket 24B and the wheel 16A of the rear wheel 16 rotate. The driving source of human power includes driving force of the small vehicle 10 and torque of the crank 20.

The battery 28 is a power supply source that is attached to the frame 12 and supplies electric power to the components 30 and the control device 40.

The components 30 are devices attached to the small vehicle 10, and actions thereof are changed under the control of the control device 40. The changes in the actions of the components 30 change an operation condition of the small vehicle 10. In the first embodiment, the components 30 include a traveling assisting device 30A, a transmission 30B, suspensions 30C and 30D, a steering damper 30E, the adjustable seat post 30F, a geometry changer 30G, braking devices 30H, and air pressure regulating devices 30I and 30J. The components 30 may include other devices than the above-mentioned ones as long as actions thereof are changed under the control of the control device 40 to change the operation condition of the small vehicle 10. The small vehicle 10 does not necessarily include all of the above-mentioned components 30 and it is sufficient that the small vehicle 10 includes at least one of the above-mentioned components 30. It is sufficient that the control device 40 controls at least one of the components 30. Although the actions of the components 30 are automatically changed under the control of the control device 40, the rider H may input, to the control device 40, instructions to change the actions of the components 30 to change the actions of the components 30.

The traveling assisting device 30A includes an assist motor (not illustrated) and assists rotation of the crank 20 by the assist motor. An example of the assist motor is an electric motor. The rotation of the assist motor is transmitted to the front sprocket 24A through a reduction gear (not illustrated). The traveling assisting device 30A changes output of the assist motor under the control of the control device 40 to change force of assisting the rotation of the crank 20, that is, the operation condition of the small vehicle 10.

The transmission 30B is an internal transmission provided on the hub 16B of the rear wheel 16, and changes the speed of rotation input to the rear sprocket 24B and transmits the rotation to the wheel 16A. The transmission 30B changes a coupling state of incorporated gears (not illustrated) under the control of the control device 40 to change the gear ratio, that is, the operation condition of the small vehicle 10. The transmission 30B is not limited to the internal transmission and may be an external transmission. In this case, the sprockets 24 having different diameters are provided and the transmission 30B changes the sprockets 24 around which the chain 26 is wound to switch the gear ratio of the small vehicle 10.

The suspension 30C is a front suspension provided on the fork 13 and supporting the front wheel 14 such that the position of the front wheel 14 relative to the fork 13 can be changed. The suspension 30C includes an elastic body (not illustrated) and converts impact applied to the front wheel 14 into elastic energy to absorb the impact. Examples of the elastic body include a cylinder encapsulating therein a spring, the air, oil, magnetic fluid, and the like. The suspension 30C changes a state of the incorporated elastic body, that is, the operation condition of the small vehicle 10 under the control of the control device 40. For example, when the control device 40 controls to carry out lockout, the suspension 30C supports the front wheel 14 in a state of fixing the position of the front wheel 14 relative to the fork 13. When the control device 40 controls to adjust travel, the suspension 30C changes the stroke, that is, the operation amount thereof. When the control device 40 controls to adjust damping, the suspension 30C changes the damping rate of impact.

The suspension 30D is a rear suspension provided between the top tube 12C and the link 12D and supporting the rear wheel 16 such that the position of the rear wheel 16 relative to the top tube 12C can be changed. The suspension 30D includes an elastic body (not illustrated) and converts impact applied to the rear wheel 16 into elastic energy to absorb the impact. The type of the elastic body included in the suspension 30D is the same as the elastic body in the suspension 30C. Details of control of the suspension 30D by the control device 40 are also the same as the details of control of the suspension 30C.

The steering damper 30E is a damper attached between the head tube 12A and the handlebar 18 and damps vibration that is transmitted to the handlebar 18. The steering damper 30E changes the damping rate of the vibration, that is, the operation condition of the small vehicle 10 under the control of the control device 40.

The adjustable seat post 30F is supported on the seat tube 12B such that the position thereof relative to the seat tube 12B can be changed. The saddle 17 is attached to the front end of the adjustable seat post 30F. Accordingly, the position of the adjustable seat post 30F relative to the seat tube 12B is changed, so that the position of the saddle 17 relative to the seat tube 12B is changed. The adjustable seat post 30F changes the position of the saddle 17 relative to the seat tube 12B, that is, the operation condition of the small vehicle 10 under the control of the control device 40.

The geometry changer 30G changes the geometry of the frame 12, that is, the operation condition of the small vehicle 10 under the control of the control device 40. In the first embodiment, the geometry changer 30G is provided on the head tube 12A. The geometry changer 30G changes the length of the head tube 12A. The height of the handlebar 18 is changed by changing the length of the head tube 12A. The geometry changer 30G is not limited to changing the length of the head tube 12A as long as it changes the geometry of the main body 11 under the control of the control device 40.

The braking devices 30H are braking devices that stop rotation of the front wheel 14 and the rear wheel 16 by gripping rotating bodies RT that are attached to the hub 14B of the front wheel 14 and the hub 16B of the rear wheel 16. In the first embodiment, the rotating bodies RT are disk brake rotors, and the braking devices 30H are disk brake calipers. The braking devices 30H change braking force of stopping the rotation of the front wheel 14 and the rear wheel 16, that is, the operation condition of the small vehicle 10 under the control of the control device 40. The configuration of the braking devices 30H is not limited to the above-mentioned configuration as long as they stop the rotation of the front wheel 14 and the rear wheel 16.

The air pressure regulating device 30I changes the air pressure in a tire of the front wheel 14, that is, the operation condition of the small vehicle 10 under the control of the control device 40. The air pressure regulating device 30I is, for example, a valve and a tank attached to a tire valve of the front wheel 14. The air pressure regulating device 30I changes the air pressure in the front wheel 14 by reversing the air in the tire of the front wheel 14 and the air in the tank by opening and closing the valve under the control of the control device 40. The configuration of the air pressure regulating device 30I is not limited to the above-mentioned configuration as long as it is a device changing the air pressure in the front wheel 14.

The air pressure regulating device 30J changes the air pressure in a tire of the rear wheel 16, that is, the operation condition of the small vehicle 10 under the control of the control device 40. The configuration and the air pressure control method of the air pressure regulating device 30J are the same as those of the air pressure regulating device 30I.

The actions of the components 30 are changed under the control of the control device 40 to change the operation condition of the small vehicle 10, as described above.

The detector 32 is a sensor configured to detect the traveling direction of the small vehicle 10. In the first embodiment, the detector 32 is a gyroscope sensor and is attached to the frame 12 (the seat tube 12B in the example of FIG. 1). The posture of the frame 12 is changed while following the traveling direction of the small vehicle 10. Accordingly, the detector 32 can detect the traveling direction of the small vehicle 10 by detecting a posture angle of the frame 12 with respect to a global coordinate system. The detector 32 is not limited to the gyroscope sensor as long as it is a sensor detecting the traveling direction of the small vehicle 10. The small vehicle 10 does not necessarily include the detector 32.

The control device 40 is a control device configured to control the components 30 and is attached to the small vehicle 10. In the first embodiment, the control device 40 is a cycle computer attached to the handlebar 18 and includes an input unit 41, a display unit 42, and an internal device 44. The input unit 41 is a mechanism receiving operations by the rider H and is, for example, a button or a touch panel. The display unit 42 is a mechanism configured to display information and is, for example, a liquid crystal panel. The internal device 46 is a device provided in the control device 40 and performs operation and communication for controlling the components 30. The functional configuration of the internal device 46 will be described later. It is sufficient that the control device 40 is a control device attached to the small vehicle 10 that controls the components 30, and the control device 40 is not limited to the cycle computer.

The detection device 50 is a device attached to the rider H that is configured to obtain environmental information about surroundings of the rider H, that is, the small vehicle 10. The detection device 50 according to the first embodiment is not attached to the small vehicle 10 and is a device separated from the control device 40. The detection device 50 includes a main body 52, a sensor device 54, an attaching unit 56 (e.g., a mount), a communication unit 57, and a detector 58. The main body 52 is a housing serving as a main body of the detection device 50 and accommodates therein the communication unit 57 and the detector 58. The sensor device 54 is a mechanism provided on the main body 52 that is configured to obtain the environmental information about the surroundings of the small vehicle 10. Details will be described later, but briefly, the sensor device 54 obtains the environmental information by outputting electromagnetic waves in a predetermined direction and receiving reflected waves of the output electromagnetic waves. Thus, the sensor device 54 may include both an electromagnetic sensor and an electromagnetic emitter.

The attaching unit 56 is a mechanism provided on the main body 52 that is configured to be attached to the rider H so as to hold the main body 52 and the sensor device 54. The attaching unit 56 is fixed to the rider H in a state of being attached to the rider H. The attaching unit 56 thereby fixes the detection device 50 in a state of attaching the detection device 50 to the rider H. That is to say, the attaching unit 56 fixes the position of the detection device 50 to an attached place of the rider H. In the first embodiment, the rider H wears a helmet HB and eyewear HC on his/her head HA. The attaching unit 56 according to the first embodiment is indirectly attached to the rider H by being attached to the helmet HB. To be more specific, the attaching unit 56 is attached to the rider H such that the output direction of the electromagnetic waves emitted by the sensor device 54 is identical to an orientation of the face of the rider H, that is, the direction of a sight line thereof. The sensor device 54 can thereby obtain the environmental information at a place that the rider H views.

The attaching unit 56 has, for example, a bolt and a nut and has a configuration of being attached to the helmet HB by fastening the bolt and the nut. The attaching unit 56 may have any configuration as long as it can be attached to the rider H (the helmet HB in this example). Although the attaching unit 56 is attached to the helmet HB, it is sufficient that the attaching unit 56 is attached to one of the helmet HB and the eyewear HC. Furthermore, the attaching unit 56 may be directly attached to the rider H or may be attached to clothing of the rider H, a bag that the rider H is carrying, or the like other than the helmet HB and the eyewear HC. It should be noted that the detection device 50 is preferably attached to the head HA of the rider H.

The communication unit 57 is a device configured to communicate with the control device 40. The communication unit 57 communicates wirelessly with the control device 40 to transmit and receive information to and from the control device 40. Details of the functions of the communication unit 57 will be described later.

The detector 58 is a sensor configured to detect the orientation of the detection device 50. In the first embodiment, the detector 58 is a gyroscope sensor and is attached to the main body 52. The detection device 50 is fixed to the head HA of the rider H. Accordingly, the orientation (posture) of the detection device 50 is changed while following movement of the head HA. The detector 58 can detect the orientation of the detection device 50 by detecting a posture angle of the detection device 50 with respect to the global coordinate system. The output direction of the electromagnetic waves emitted by the sensor device 54 is fixed with respect to the orientation of the detection device 50 and it can therefore be considered that the detector 58 detects the output direction of the electromagnetic waves emitted by the sensor device 54. The detector 58 is not limited to the gyroscope sensor as long as it is a sensor detecting the orientation of the detection device 50. The detection device 50 does not necessarily include the detector 58.

The notification device 60 is a device configured to notify the rider H of attention information under the control of the control device 40. The attention information is information that is output when attention of the rider H is required to be attracted during traveling as in the case of presence of an obstacle ahead in the traveling direction. In the first embodiment, the notification device 60 is a vibration device that is attached to the rider H. The notification device 60 outputs sound as the attention information under the control of the control device 40. The notification device 60 outputs, as the attention information, predetermined desired vibration such as an alarm, notification indicating presence of an obstacle, and notification indicating rough ground. The notification device 60 is not limited to the vibration device as long as it is a device that notifies the rider H of the attention information. The notification device 60 may be attached to a position other than the rider H, such as the eyewear, or may be attached to the small vehicle 10. The notification device 60 may be included in a device that the rider H is carrying. The notification device 60 may output light or vibration as the attention information or output them in combination. That is to say, it is sufficient that the notification device 60 outputs at least one of sound, light, and vibration. The notification device 60 includes at least one of a cycle computer, eyewear, a smartphone, a tablet device, a smartwatch, a personal computer, a lamp, and a speaker.

Functional Configurations of Control Device and Detection Device

Figure 2:
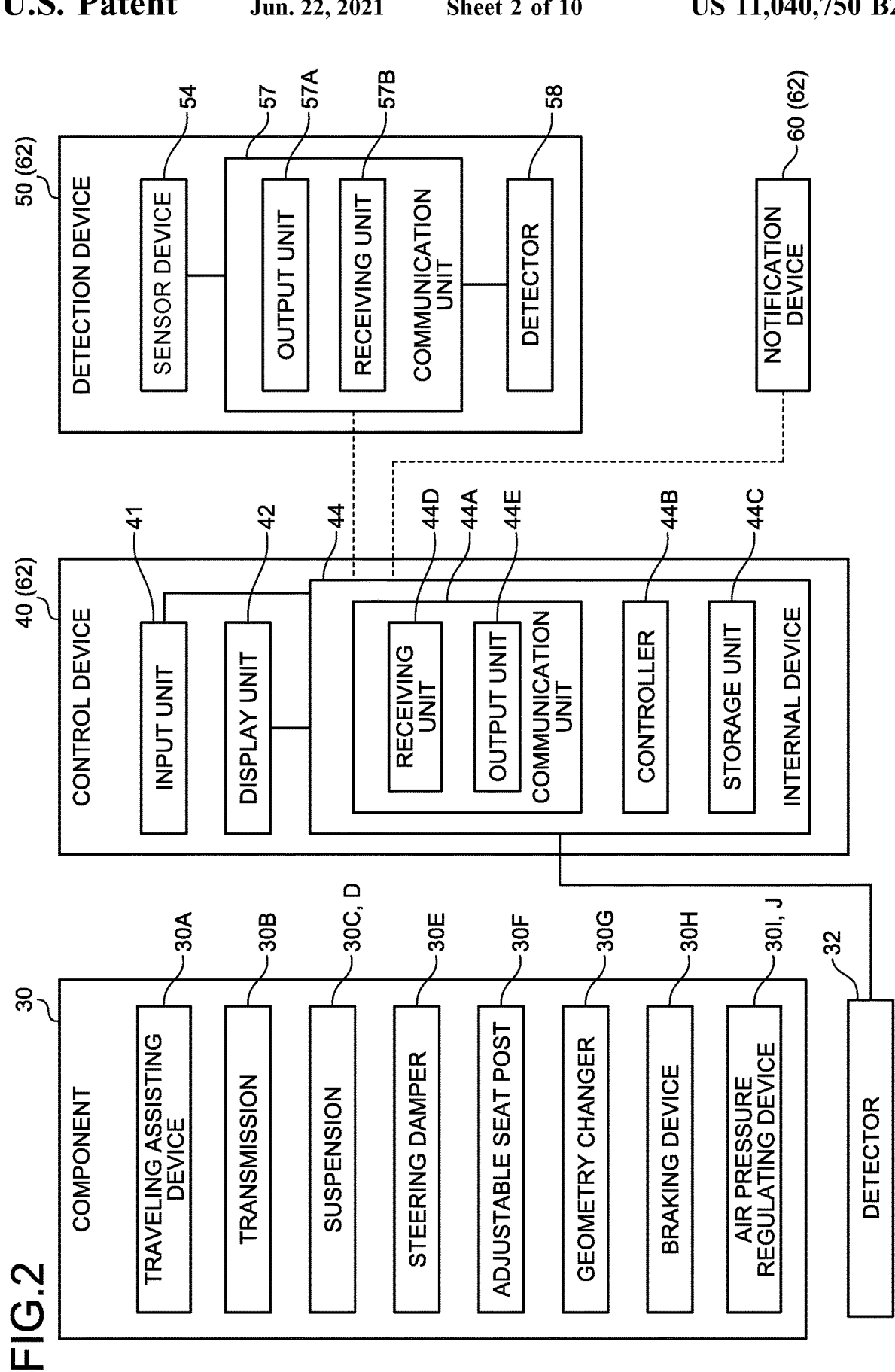
FIG. 2 is a block diagram for explaining functions of a control device and a detection device according to the first embodiment.

Next, the functional configurations of the control device 40 and the detection device 50 will be described. FIG. 2 is a block diagram for explaining functions of the control device and the detection device according to the first embodiment. As illustrated in FIG. 2, the control device 40 includes the input unit 41, the display unit 42, and the internal device 44. The internal device 44 includes a communication unit 44A, a controller 44B, and a storage unit 44C.

The communication unit 44A is a device in communication with the communication unit 57 of the detection device 50. The communication unit 44A includes a receiving unit 44D and an output unit 44E. The communication unit 44A receives information from the communication unit 57 by the receiving unit 44D and outputs information to the communication unit 57 by the output unit 44E. The communication unit 44A communicates with the communication unit 57 via wireless communication. The communication unit 44A may instead communicate with the communication unit 57 via wired communication.

The controller 44B is an arithmetic device, that is, a processor such as a central processing unit (CPU), and determines control details for controlling the actions of the components 30 by arithmetic operation. The controller 44B controls the notification device 60. The storage unit 44C is a memory storing therein arithmetic operation details of the controller 44B, information received from the detection device 50, and the like, and is, for example, a random access memory (RAM), a read only memory (ROM), or a flash memory.

As illustrated in FIG. 2, the detection device 50 includes the sensor device 54, the communication unit 57, and the detector 58. The communication unit 57 communicates with the communication unit 44A of the control device 40 via wireless communication. The communication unit 57 includes an output unit 57A (e.g., an output device such as a transmitter) and a receiving unit 57B (e.g. a reception device such as a receiver). The communication unit 57 outputs information such as the environmental information to the communication unit 44A by the output unit 57A and receives information from the communication unit 44A by the receiving unit 57B.

Obtaining of Environmental Information

Figure 3:
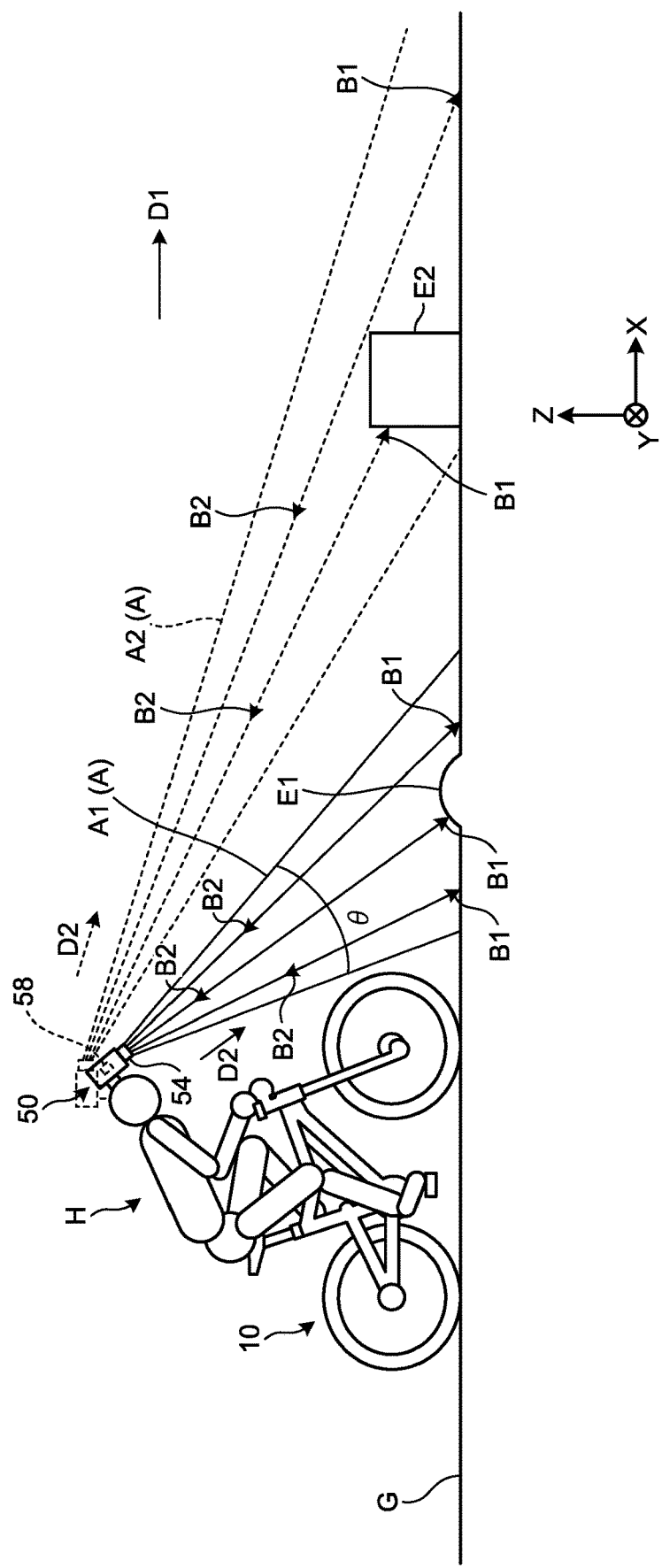
FIG. 3 is a schematic view for explaining how to obtain environmental information.

Hereinafter, how to obtain the environmental information by the detection device 50 will be described. FIG. 3 is a schematic view for explaining how to obtain the environmental information. In the following description, a direction X, a direction Y, and a direction Z are defined as the global coordinate system. The direction X is a horizontal direction, and the direction Y is a horizontal direction and is orthogonal to the direction X. The direction Z is a direction orthogonal to the direction X and the direction Y, that is, the vertical direction. FIG. 3 illustrates an example in which the small vehicle 10 that the rider H drives is traveling on a ground surface G. The small vehicle 10 drives in a traveling direction D1.

As illustrated in FIG. 3, the sensor device 54 of the detection device 50 outputs electromagnetic waves B1 toward the surroundings, to be specific, in a detection direction D2. The surroundings are surroundings of the detection device 50. In the first embodiment, the sensor device 54 radially outputs a plurality of electromagnetic waves B1 into a region A spreading in the radial direction with an angle θ with respect to a straight line toward the detection direction D2 from an output position of the electromagnetic waves B1. The electromagnetic waves B1 output by the sensor device 54 are emitted to an object located in the detection direction D2 of the sensor device 54 and are reflected by the object. Electromagnetic waves B2 reflected by the object travel toward the sensor device 54. The sensor device 54 receives the electromagnetic waves B2 traveling toward the sensor device 54. When the electromagnetic waves reflected by the object scatter in different directions, the sensor device 54 receives, as the electromagnetic waves B2, the electromagnetic waves traveling toward the sensor device 54 among the scattered electromagnetic waves. The electromagnetic waves B1 are electromagnetic waves having frequencies of 30 GHz or higher and are, for example, any one of millimeter waves, submillimeter waves, infrared rays, visible rays, and ultraviolet rays. Accordingly, the electromagnetic waves B2 are also electromagnetic waves having the frequencies of 30 GHz or higher and are, for example, any one of the millimeter waves, submillimeter waves, infrared rays, visible rays, and ultraviolet rays. The sensor device 54 preferably outputs the electromagnetic waves B1 as pulse waves for each predetermined time. The angle θ of the region A is preferably larger than 0° and smaller than 180°. More preferably, the angle θ of the region A is equal to or larger than 0° and equal to or smaller than 150°. Still more preferably, the angle θ of the region A is equal to or larger than 0° and equal to or smaller than 90°. The sensor device 54 does not necessarily radially output the electromagnetic waves B1 into the region A as long as it emits the electromagnetic waves B1 in the detection direction D2.

The sensor device 54 obtains the received electromagnetic waves B2 as the environmental information about the surroundings. The detection device 50 outputs the obtained environmental information to the control device 40 by the output unit 57A. In the first embodiment, the output unit 57A outputs, to the control device 40, data of the electromagnetic waves B2 received by the sensor device 54 without particularly adding processing thereto. The control device 40 analyzes the environmental information and determines control details of the components 30.

When the sensor device 54 receives the electromagnetic waves B2, it is considered that an object, that is, a detection target object, is present in the detection direction D2 because the electromagnetic waves B2 are reflected waves from the object located in the detection direction D2 of the sensor device 54. Accordingly, the electromagnetic waves B2, that is, the environmental information that the sensor device 54 obtains can be considered to be information for detecting whether the detection target object is present in the detection direction D2. The detection target object in the detection direction D2 includes the ground surface G, obstacles on the ground surface G, and obstacles separated from the ground surface G.

The characteristics of the electromagnetic waves B2 vary with variation in the shape of the detection target object, to be specific, deformation of the ground surface G in the Z direction. The sensor device 54 can therefore detect not only presence of an object in the detection direction D2 but also the variation in the shape of the ground surface G in the detection direction D2 and presence of an obstacle on the ground surface G by receiving the electromagnetic waves B2. That is to say, when there is an irregularity, a slope, or an obstacle on the ground surface G in the detection direction D2, it can be considered that the ground surface G in the vicinity of the detection direction D2 is deformed in the Z direction. Accordingly, the environmental information that the sensor device 54 obtains with the electromagnetic waves B2 can be considered to be information for detecting the deformation, in the Z direction, of the ground surface G in the vicinity of the detection direction D2. As described above, the environmental information can be considered to be information for determining whether the object is present in the detection direction D2 and can also be considered to be information for determining whether the ground surface G in the vicinity of the detection direction D2 is deformed in the Z direction.

An example of obtaining the environmental information as described above will be described with reference to FIG. 3. As illustrated in FIG. 3, the sensor device 54 outputs the electromagnetic waves B1 into a region A1. In this case, the characteristics of the electromagnetic wave B2 reflected by the flat ground surface G in the region A1 and the characteristics of the electromagnetic wave B2 reflected by a projection E1 on the ground surface G are different from each other. Accordingly, the sensor device 54 can obtain environmental information indicating that the ground surface G projects in the Z direction at a position of the projection E1 by receiving these electromagnetic waves B2. Although the positions of the small vehicle 10 and the rider H when the electromagnetic waves B1 are output and those when the electromagnetic waves B2 are received are the same as each other in FIG. 3, the positions of the small vehicle 10 and the rider H change in practice.

The sensor device 54 is fixed to the head HA of the rider H with the attaching unit 56 such that the detection direction D2 coincides with the sight line direction of the rider H. Accordingly, when the rider H moves his/her head HA to change a viewing target place, the detection direction D2 is also changed following the movement of the head HA. An example will be described in which the rider H faces, in the traveling direction D1, ahead of the position at which the electromagnetic waves B1 are output into the region A1 as illustrated in FIG. 3. In this case, the orientation of the sensor device 54, that is, the detection direction D2 is changed to the traveling direction D1 accompanying the movement of the rider H. Accordingly, the sensor device 54 emits the electromagnetic waves B1 into a region A2 positioned ahead of the region A1 in the traveling direction D1. The sensor device 54 can thereby obtain, in addition to the environmental information in the region A1, the environmental information in the region A2, in this example, information on an obstacle E2. In this manner, the environmental information includes information on a place in the detection direction D2 of the rider H. The environmental information therefore includes not only the information on a place in the traveling direction D1 of the rider H but also pieces of information on places in various directions. Accordingly, the sensor device 54 can obtain pieces of environmental information at places in the traveling direction of the small vehicle 10 including not only a place in the current traveling direction D1 of the small vehicle 10 but also places in directions other than the current traveling direction.

Figure 4:
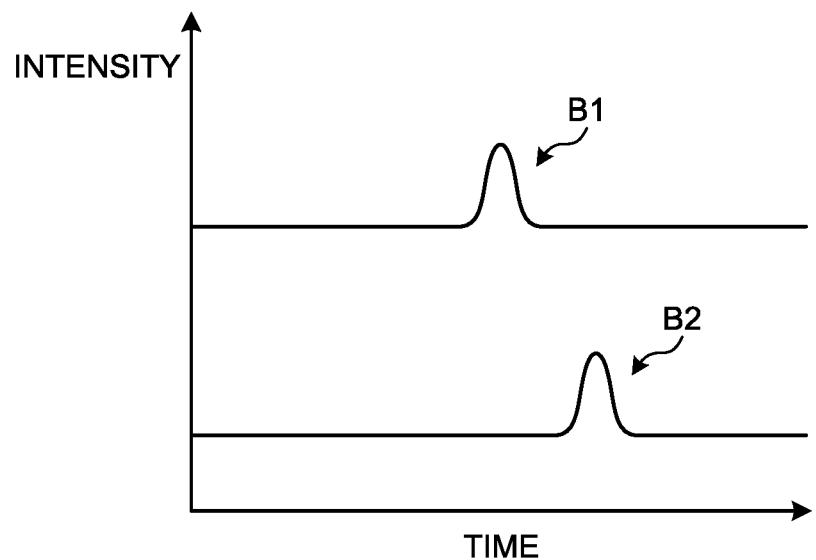
FIG. 4 is a graph for explaining reception of electromagnetic waves.

An example of the variation in the characteristics of the electromagnetic wave B2 will be described. FIG. 4 is a graph for explaining reception of the electromagnetic waves. In FIG. 4, the transverse axis indicates time, and the longitudinal axis indicates the intensity of the electromagnetic waves. As illustrated in FIG. 4, since the electromagnetic wave B1 is a pulse wave, the electromagnetic wave B2 as the reflected wave is also a pulse wave having pulses. The time at which the sensor device 54 obtains the electromagnetic wave B2 is later than the time at which the sensor device 54 outputs the electromagnetic wave B1 as a source of the electromagnetic wave B2. The difference between the time at which the sensor device 54 obtains the electromagnetic wave B2 and the time at which the sensor device 54 outputs the electromagnetic wave B1 is determined in accordance with a distance between the position of the sensor device 54 and the position at which the electromagnetic wave B2 is reflected. The deformation of the ground surface G in the Z direction changes the distance between the position of the sensor device 54 and the position at which the electromagnetic wave B2 is reflected. Accordingly, the sensor device 54 can detect the deformation of the ground surface G in the Z direction by detecting a differential amount in that time. In this manner, the difference in the characteristics of the electromagnetic wave B2 in the example of FIG. 4 indicates a difference in the differential amount in that time. The method for detecting the deformation of the ground surface G in the Z direction by the sensor device 54 is not limited to this example.

As described above, the sensor device 54 obtains the environmental information by outputting the electromagnetic waves B1 and receiving the electromagnetic waves B2 as the reflected waves thereof. That is to say, the sensor device 54 does not shoot the detection target object to obtain shot image data as the environmental information. The sensor device 54 uses no image data, thereby reducing the data processing amount. It should be noted that the sensor device 54 may shoot the detection target object to obtain the shot image data as the environmental information. When electromagnetic waves output from something other than the sensor device 54 are emitted to the detection target object, the detection target object reflects the output electromagnetic waves as the electromagnetic waves. The sensor device 54 does not necessarily output the electromagnetic waves B1 but may receive the reflected electromagnetic waves as the environmental information. For example, it can be said that the obtaining of the environmental information by shooting the detection target object by the sensor device 54 is the obtaining, by the sensor device 54, of reflected waves of visible light such as sunlight and illumination light emitted to the detection target object.

The detection device 50 includes the detector 58. The detector 58 detects the direction of the detection direction D2 by detecting the orientation of the detection device 50. To be more specific, the detector 58 detects, as detection direction information, the direction of the detection direction D2 in the directions X, Y, and Z (global coordinates). Also when the orientation of the detection device 50 is changed in response to the movement of the rider H, the detector 58 successively detects the detection direction information. The detection device 50 can detect a detected position corresponding to the environmental information that the sensor device 54 has obtained more accurately by detecting the detection direction information together with the environmental information. The detection device 50 does not necessarily detect the detection direction information as long as it detects the environmental information.

The detection device 50 successively obtains the environmental information and the detection direction information described above. The detection device 50 associates the obtained environmental information and detection direction information with each other and outputs, by the output unit 57A, the associated environmental information and detection direction information to the control device 40. In other words, the output unit 57A outputs, to the receiving unit 44D via wireless communication, the environmental information being associated with information (detection direction information) indicating in which direction the detection device 50 is directed when the environmental information is obtained.

The detection device 50 may receive, by the receiving unit 57B, an instruction from the control device 40. The detection device 50 may receive, from the control device 40, an instruction to change a sampling cycle of the environmental information and the detection direction information and change the sampling cycle of the environmental information and the detection direction information based on the instruction. The detection device 50 does not necessarily include the output unit 57A, and the detection device 50 itself may obtain the environmental information and the detection direction information under determined conditions.

Determination of Control Contents

By referring to FIG. 2 again, control by the control device 40 will be described. The control device 40 determines the control details of the components 30 based on the environmental information and the detection direction information that the detection device 50 has obtained. To be specific, the receiving unit 44D of the control device 40 receives the environmental information and the detection direction information from the detection device 50. The controller 44B of the control device 40 analyzes the environmental information received by the receiving unit 44D and determines a condition of a detection target position of the environmental information to determine the control details of the components 30. The detection target position of the environmental information indicates a position at which the environmental information is obtained. That is to say, for example, the detection target position of the environmental information when the environmental information on the projection E1 illustrated in FIG. 3 has been obtained indicates the position of the projection E1. The control device 40 forms a waveform of the electromagnetic waves B2 based on, for example, the environmental information, that is, pieces of successive data of the electromagnetic waves B2 from the detection device 50. The control device 40 determines whether the detection target object is present at the detection target position of the environmental information based on the waveform of the electromagnetic waves B2 and further determines the degree of deformation, in the Z direction, of the ground surface G at the detection target position of the environmental information. The control device 40 determines the control details of the components 30 based on the determination result thereof.

When the controller 44B determines that the detection target position of the environmental information is an upward slope, for example, the controller 44B determines, as the control details, control to increase output of the traveling assisting device 30A and control to increase the gear ratio of the transmission 30B. When the controller 44B determines that the irregularities of the ground surface G at the detection target position of the environmental information are large, the controller 44B determines, as the control details, control to increase a damping rate of impact by adjusting damping of the suspensions 30C and 30D and control to increase a vibration damping rate of the steering damper 30E. When the controller 44B determines that an obstacle is present, the controller 44B determines, as the control details, control to increase the braking force by the braking devices 30H.

The controller 44B determines a relative position, to the small vehicle 10, of the detection target position of the environmental information based on the detection direction information. To be specific, the controller 44B obtains information on the traveling direction D1 detected by the detector 32. The detector 32 detects, as the information on the traveling direction D1, the directions of the detection direction D1 in the directions X, Y, and Z. The controller 44B specifies the relative position, to the small vehicle 10, of the detection target position of the environmental information based on the information in the traveling direction D1 and the information on the detection direction D2 as the detection direction information, and obtains information on the specified position as positional information. For example, the controller 44B specifies, as the positional information, the detection target position of the environmental information relative to the current position of the small vehicle 10 from a direction angle difference between the detection direction D2 and the traveling direction D1.

The controller 44B determines whether the small vehicle 10 enters the detection target position of the environmental information based on the positional information. In the case in which, for example, the detection target position of the environmental information is determined to deviate to the right side from the traveling direction D1 in obtaining the positional information, when the traveling direction D1 is changed to the right side thereafter, the controller 44B determines that the small vehicle 10 enters the detection target position of the environmental information. When the controller 44B determines that the small vehicle 10 enters the detection target position of the environmental information, the controller 44B controls the components 30 with the control details determined for the detection target position of the environmental information.

The controller 44B controls the notification device 60 based on the environmental information. That is to say, when the controller 44B determines that the small vehicle 10 enters the detection target position of the environmental information and attention of the rider H is required to be attracted based on the environmental information, the controller 44B causes the notification device 60 to notify the rider H of the attention information. The rider H is notified of the attention information, and thus can pay attention to a place that the rider H will enter.

Figure 5:
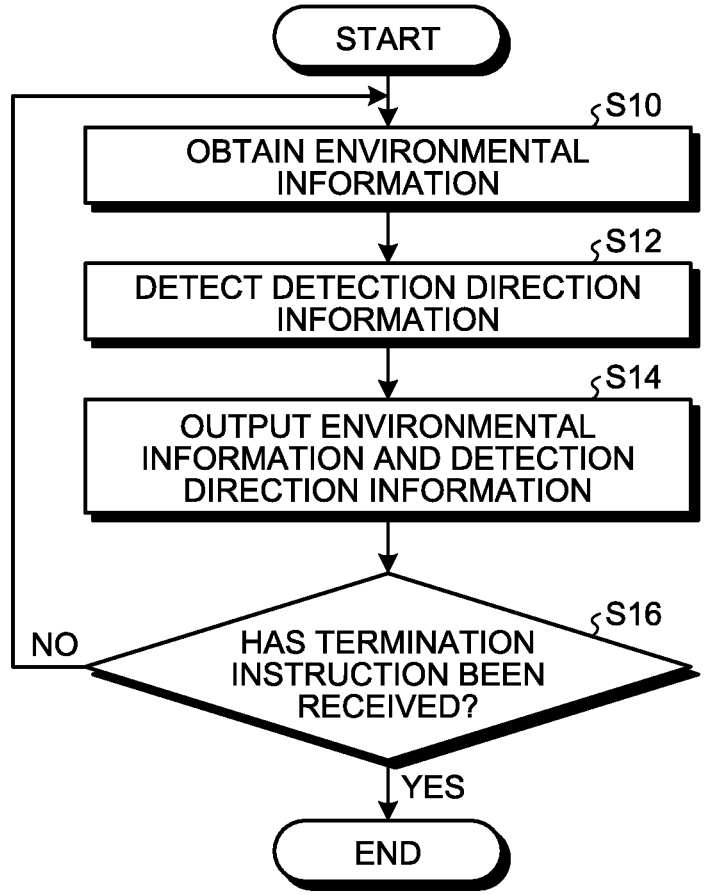
FIG. 5 is a flowchart for explaining operation flow of the detection device.

The operation flows of the detection device 50 and the control device 40 described above will be described with reference to flowcharts. FIG. 5 is a flowchart for explaining the operation flow of the detection device. As illustrated in FIG. 5, the detection device 50 obtains the environmental information about the surroundings by the sensor device 54 while the small vehicle 10 is traveling (step S10). The sensor device 54 obtains the environmental information by outputting the electromagnetic waves B1 in the detection direction D2 and receiving the electromagnetic waves B2 as the reflected waves of the electromagnetic waves B1. The detection device 50 obtains the detection direction information by the detector 58 (step S12). The detector 58 detects, as the detection direction information, the direction of the detection direction D2 when receiving the electromagnetic waves B2. The detection device 50 outputs the obtained environmental information and detection direction information to the control device 40 (step S14). The detection device 50 outputs the environmental information and the detection direction information in an association manner to the control device 40 via wireless communication. The detection device 50 determines whether a termination instruction has been received (step S16). When the detection device 50 determines that no termination instruction has been received (No at step S16), the process is returned to step S10 and the detection device 50 obtains subsequent environmental information. When the detection device 50 determines that a termination instruction has been received (Yes at step S16), the control is finished. The detection device 50 successively obtains the environmental information and the detection direction information and outputs them until the termination instruction is received.

Figure 6:
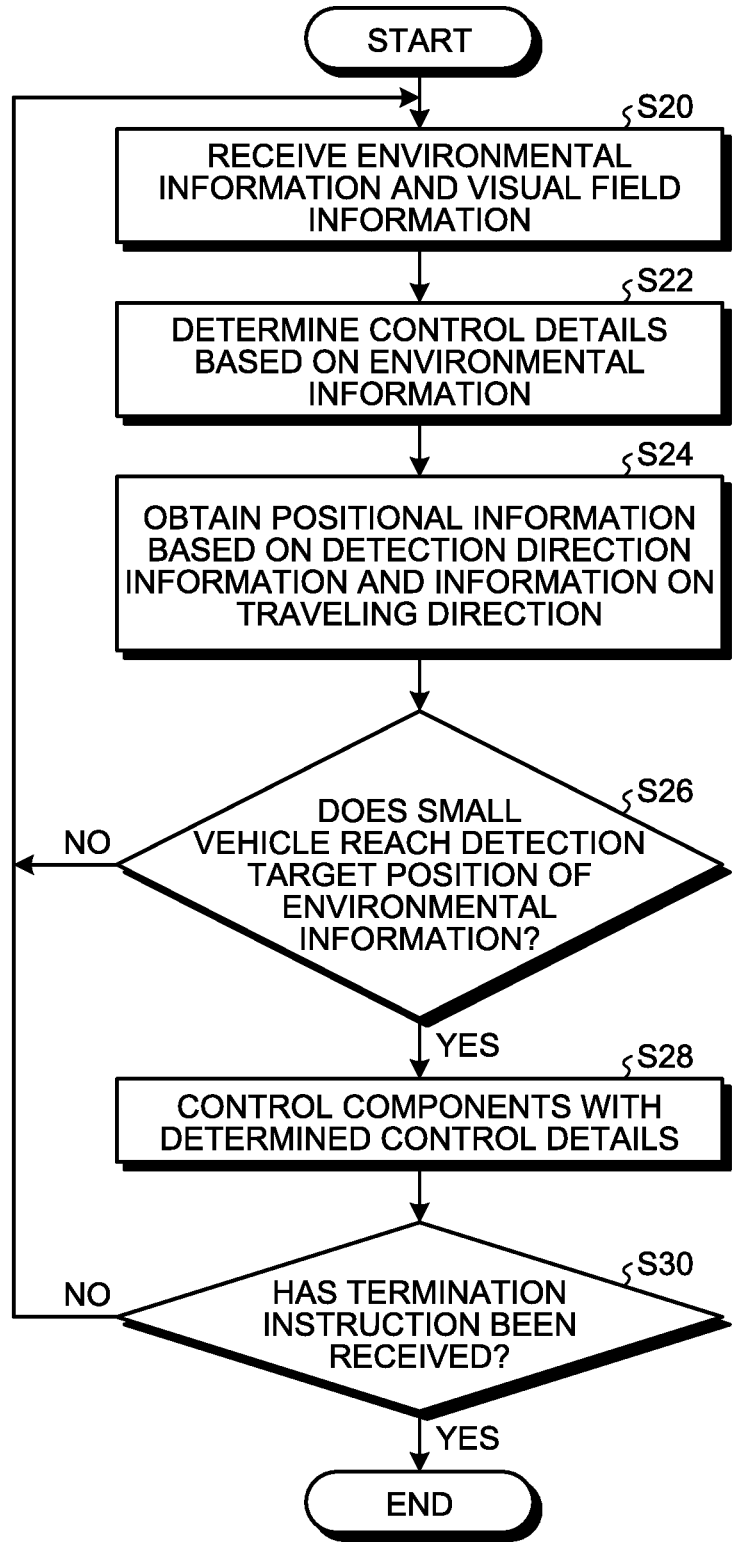
FIG. 6 is a flowchart for explaining operation flow of the control device.

FIG. 6 is a flowchart for explaining the operation flow of the control device. As illustrated in FIG. 6, the control device 40 receives, by the receiving unit 44D, the environmental information and the detection direction information from the detection device 50 (step S20). The control device 40 determines, by the controller 44B, the control details based on the environmental information (step S22). Then, the controller 44B specifies the positional information based on the detection direction information and the information on the traveling direction D1 (step S24). The controller 44B specifies the relative position, to the small vehicle 10, of the detection target position of the environmental information as the positional information. The controller 44B determines whether the small vehicle 10 reaches the detection target position of the environmental information (step S26). When the controller 44B determines that the small vehicle 10 reaches the detection target position of the environmental information (Yes at step S26), the controller 44B controls the components 30 with the determined control details (step S28). When the controller 44B determines that the small vehicle 10 does not reach the detection target position of the environmental information (No at step S26), the process is returned to S20 and the controller 44B determines whether subsequent environmental information and detection direction information have been received. The controller 44B determines whether a termination instruction has been received (step S30). When the controller 44B determines that no termination instruction has been received (No at step S30), the process is returned to step S20 and the controller 44B determines whether the subsequent environmental information and detection direction information have been received. When the detection device 50 determines that a termination instruction has been received (Yes at step S30), the control is finished.

Figure 7:
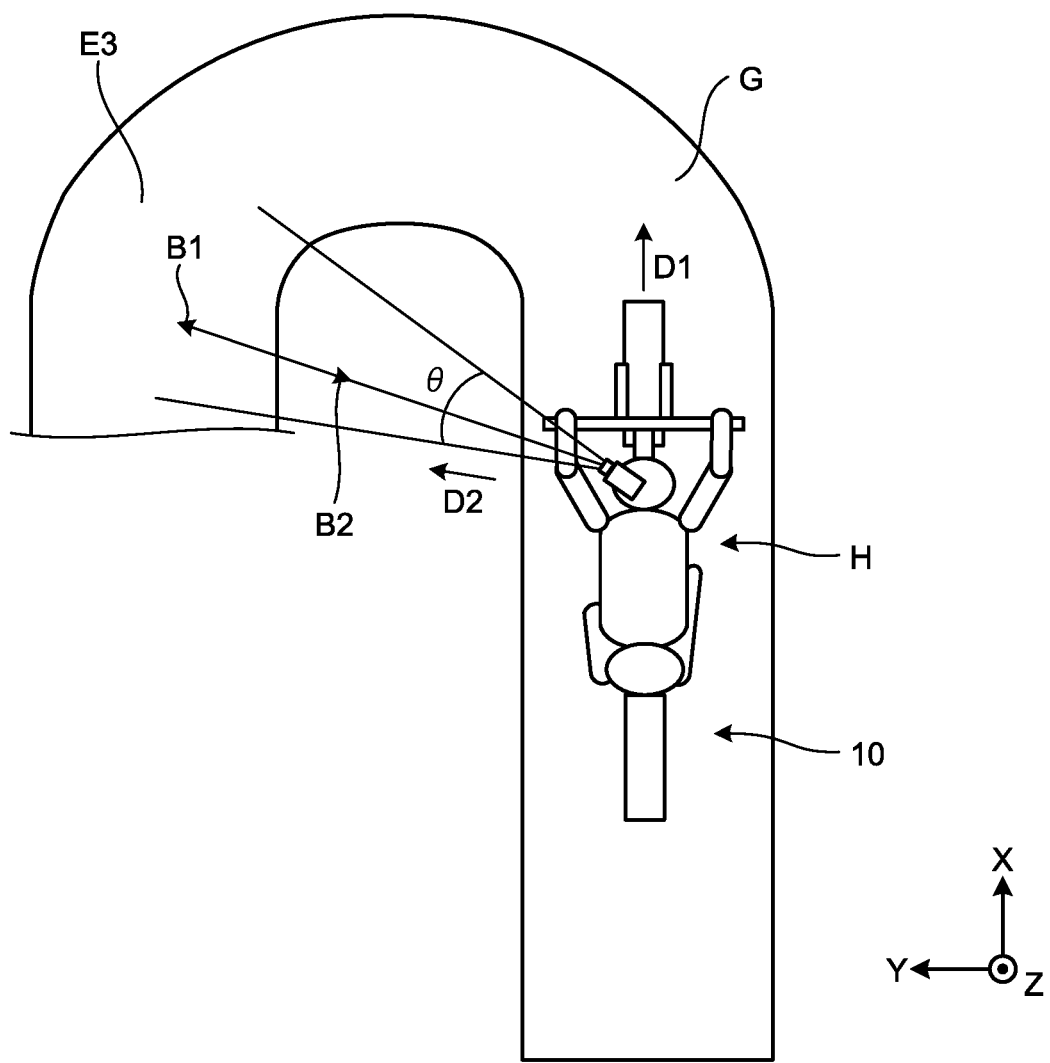
FIG. 7 is a view illustrating an example in which a small vehicle is traveling along a turn-back corner.

As described above, the detection device 50 in the first embodiment is attached to the rider H and obtains the environmental information in the detection direction D2. Accordingly, the sensor device 54 can obtain the environmental information at a position in response to the movement of the rider H, thereby obtaining the environmental information in advance. Furthermore, even when the rider H faces a direction other than the traveling direction D1, the sensor device 54 can obtain the environmental information at a corresponding position, thereby obtaining pieces of environmental information at various positions without being limited to the environmental information in the traveling direction D1 of the small vehicle 10. FIG. 7 is a view illustrating an example in which the small vehicle is traveling along a turn-back corner. FIG. 7 illustrates an example in which the small vehicle 10 is coming to the turn-back corner. When, for example, a fixed camera for shooting the traveling direction D1 is provided on the small vehicle 10, it can shoot an entrance side of the corner but cannot shoot an exit position E3 of the corner. Accordingly, in this case, it is difficult to detect information on the exit position E3 of the corner in advance and there is the risk that preparation for control of the components 30 when the small vehicle 10 is traveling on the exit position E3 cannot be properly performed. By contrast, the detection device 50 according to the first embodiment is attached to the rider H, so that the environmental information at the exit position E3 can be obtained simply by the rider H viewing the exit position E3. The usage of the detection device 50 therefore enables the preparation for the control of the components 30 to be properly performed even when the small vehicle 10 is traveling on a turn-back corner.

The detection device 50 successively obtains pieces of environmental information at various positions and outputs them to the control device 40. Accordingly, the control device 40 can perform control in accordance with the environment at any position that the small vehicle 10 enters by recognizing environments at various positions and determining respective control details in advance.

Figure 8:
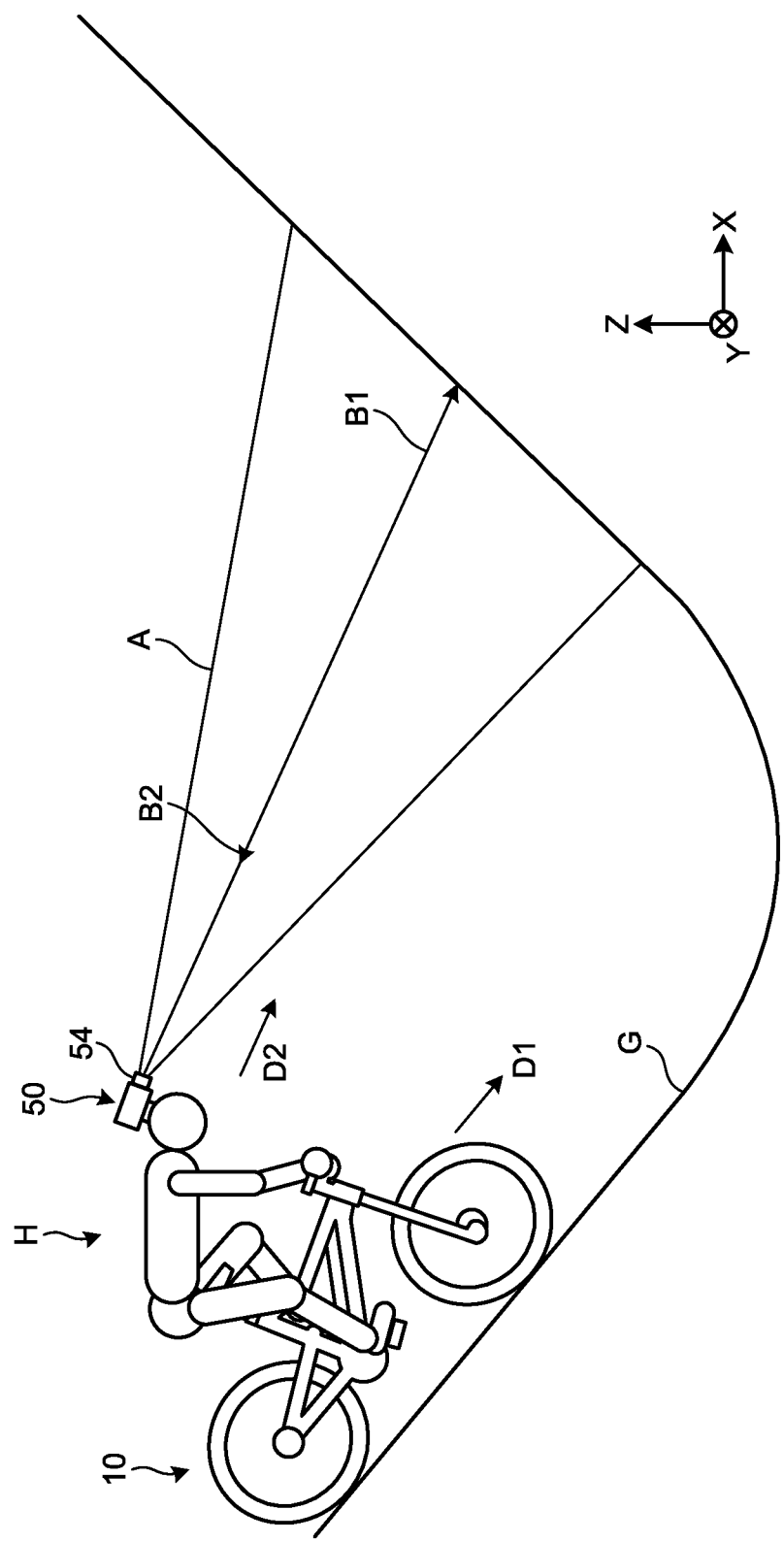
FIG. 8 is a view illustrating an example in which the small vehicle is traveling on a place with a sudden change in a gradient.
Figure 9:
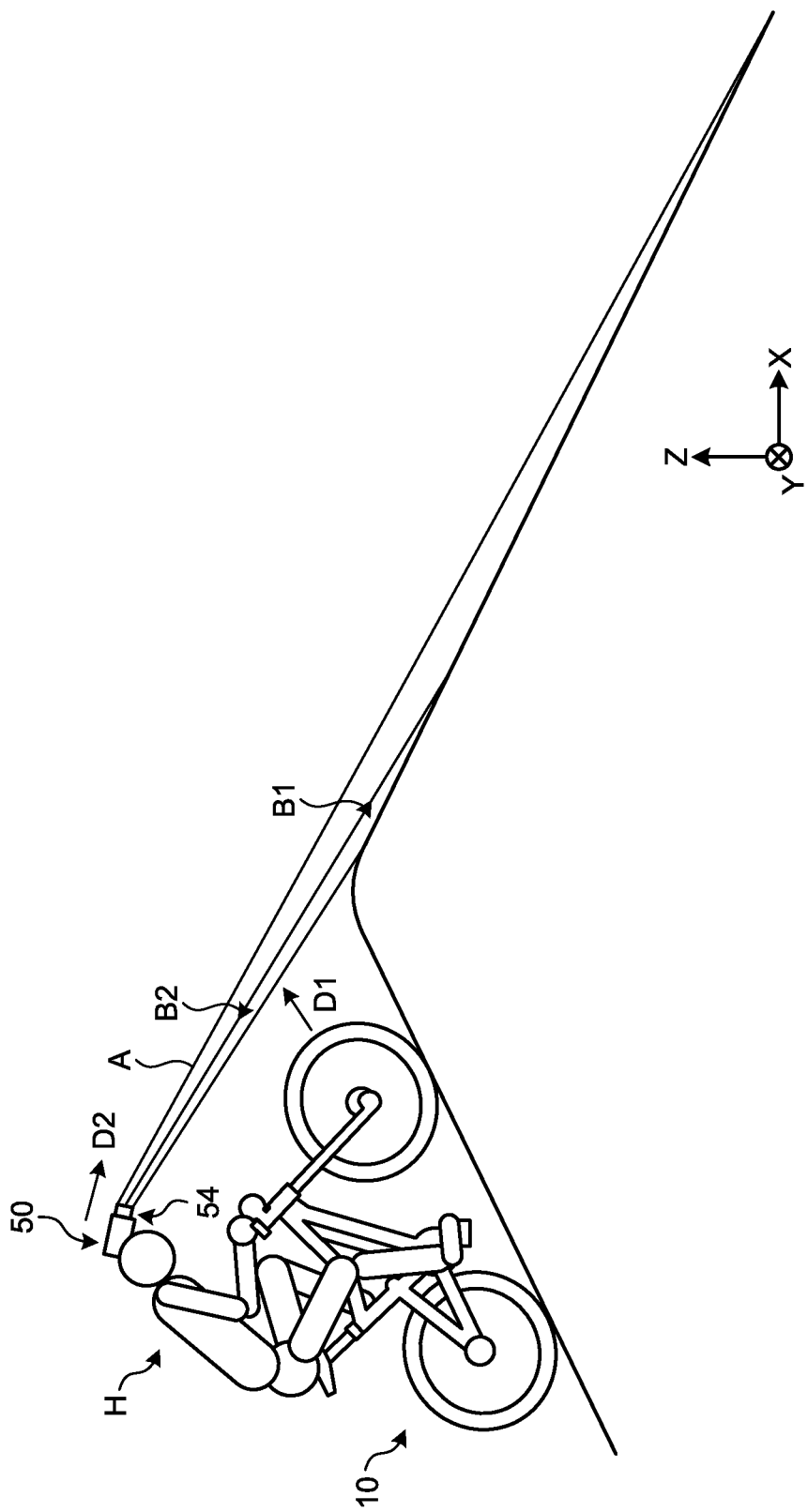
FIG. 9 is a view illustrating another example in which the small vehicle is traveling on the place with the sudden change in the gradient.

FIGS. 8 and 9 are views illustrating examples in which the small vehicle travels on a place with a sudden change in a gradient. FIG. 8 illustrates an example in which the small vehicle 10 is traveling on a downward slope and there is an upward slope subsequent to the downward slope. In this case, the traveling direction D1 extends to a direction (downward in the vertical direction) opposite to the direction Z, and presence of the upward slope cannot be detected simply by referring to the environmental information in the traveling direction D1. In contrast to this, the detection device 50 can obtain the environmental information on the upward slope to detect the presence of the upward slope in advance when the rider H faces the upward slope. Furthermore, the control device 40 detects the direction of the traveling direction D1 by the detector 32. When the control device 40 detects that the current traveling direction D1 extends downward in the vertical direction and the upward slope is present ahead in the traveling direction D1, the control device 40 determines that the small vehicle 10 is coming to an upward slope. In this case, the control device 40 can perform preparation for the control for the upward slope in advance. The control device 40 may determine that the small vehicle 10 is coming to an upward slope based on the detection direction information on the detection device 50, that is, the direction of the detection direction D2 and the direction of the traveling direction D1. That is to say, the control device 40 may determine that the small vehicle 10 is coming to an upward slope when the electromagnetic waves B2 are received and the detection direction D2 extends upward in the vertical direction relative to the traveling direction D1.

FIG. 9 illustrates an example in which the small vehicle 10 is traveling on an upward slope and there is a downward slope subsequent to the upward slope. In this case, the traveling direction D1 extends upward in the vertical direction, and presence of the downward slope cannot be detected simply by referring to the environmental information in the traveling direction D1. In contrast to this, the detection device 50 can obtain the environmental information on the downward slope to detect the presence of the downward slope in advance when the rider H faces the downward slope. When the control device 40 detects that the current traveling direction D1 extends upward in the vertical direction and the downward slope is present ahead in the traveling direction D1, the control device 40 determines that the small vehicle 10 is coming to a downward slope. In this case, the control device 40 can perform preparation for control for the downward slope in advance. The control device 40 may determine that the small vehicle 10 is coming to a downward slope based on the detection direction information on the detection device 50, that is, the direction of the detection direction D2 and the direction of the traveling direction D1. That is to say, the control device 40 may determine that the small vehicle 10 is coming to a downward slope when the electromagnetic waves B2 are received and the detection direction D2 extends downward in the vertical direction relative to the traveling direction D1.

Second Embodiment

Next, a second embodiment will be described. A detection device 150 according to the second embodiment is different from the first embodiment in the point that the detection device 150 is attached to the small vehicle 10. Description of common configurations in the second embodiment to those in the first embodiment is omitted.

Figure 10:
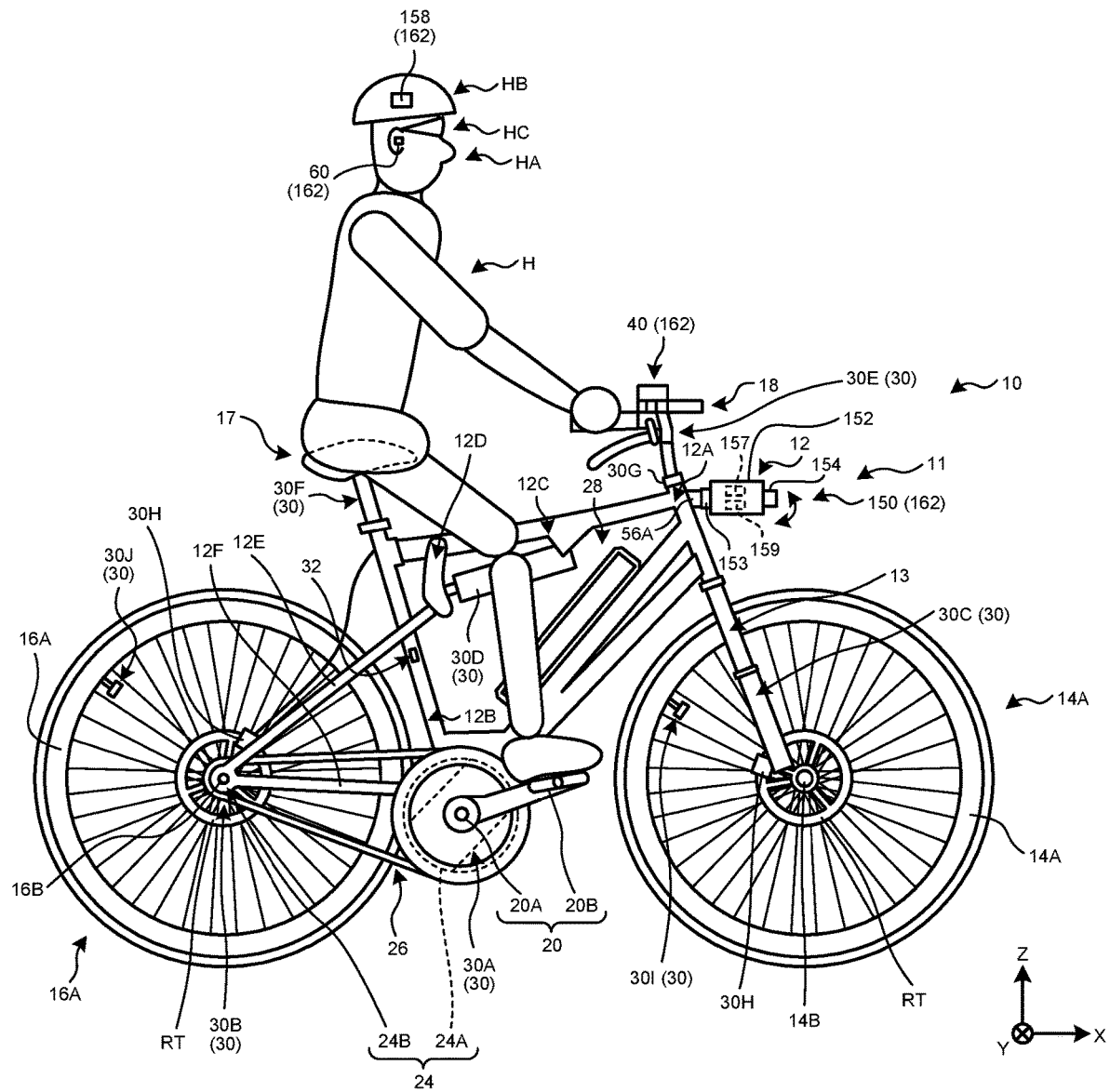
FIG. 10 is a schematic front view of a small vehicle according to a second embodiment.

FIG. 10 is a schematic front view of the small vehicle according to the second embodiment. As illustrated in FIG. 10, the detection device 150 is attached to the head tube 12A of the small vehicle 10. The detection device 150 includes a main body 152, a position adjusting unit 153, a sensor device 154, an attaching unit 156 (e.g., a mount), a communication unit 157 having an output unit 157A (e.g., an output device such as a transmitter) and a receiving unit 157B (e.g., a reception device such as a receiver), and a controller 159. A detector 158 is not attached to the detection device 150 but is attached to the rider H. The control device 40, the detection device 150, and the detector 158 configure a control system 162.

Although the detector 158 is attached to the helmet HB of the rider H in the second embodiment, the detector is not limited to being attached thereto as long as it is attached to the rider H. The detector 158 is preferably attached to the same position as the detection device 50 according to the first embodiment. That is to say, the detector 158 is preferably attached to the head HA of the rider H.

The detector 158 is a sensor configured to detect the orientation of the rider H, to be more specific, the orientation of the head HA of the rider H. The detector 158 has the same function as that of the detector 58 except that it is attached to the rider H and detects the orientation of the head HA of the rider H. The detector 158 detects movement of the head HA of the rider H by successively detecting the orientation of the head HA of the rider H. The orientation of the head HA of the rider H corresponds to the orientation of the eyes of the rider H. Accordingly, the detector 158 can also detect movement of the orientation of the eyes of the rider H by successively detecting the orientation of the head HA of the rider H.

The attaching unit 156 is a mechanism provided on the main body 152 and attached to the small vehicle 10 so as to hold the main body 152 and the sensor device 154. To be more specific, the attaching unit 156 is attached to the frame 12 of the small vehicle 10 and is attached to the head tube 12A in the second embodiment. The attaching unit 156 is fixed to the head tube 12A in a state of being attached to the head tube 12A. The attaching unit 156 thereby fixes the detection device 150 in a state of being attached to the head tube 12A. The attaching unit 156 is attached to the frame 12 and therefore fixes the position of the main body 152 to the frame 12 without causing the main body 152 to follow movement of the handlebar 18 (steering). The attaching unit 156 may be attached to a position other than the head tube 12A as long as it is attached to the small vehicle 10.

The position adjusting unit 153 is provided between the attaching unit 156 and the main body 152 and changes the orientation of the main body 152 relative to the attaching unit 156, that is, the small vehicle 10. The position adjusting unit 153 changes the orientation of the sensor device 154, that is, the detection direction D2 relative to the traveling direction D1 by changing the orientation of the main body 152. The position adjusting unit 153 changes the orientation of the main body 152 under the control of the controller 159.

The controller 159 is a device provided in the main body 152. The controller 159 is a processor such as a CPU and controls the position adjusting unit 153 based on the orientation of the head HA of the rider H that the detector 158 has detected to cause the detection direction D2 to coincide with the orientation of the head HA of the rider H.

Figure 11:
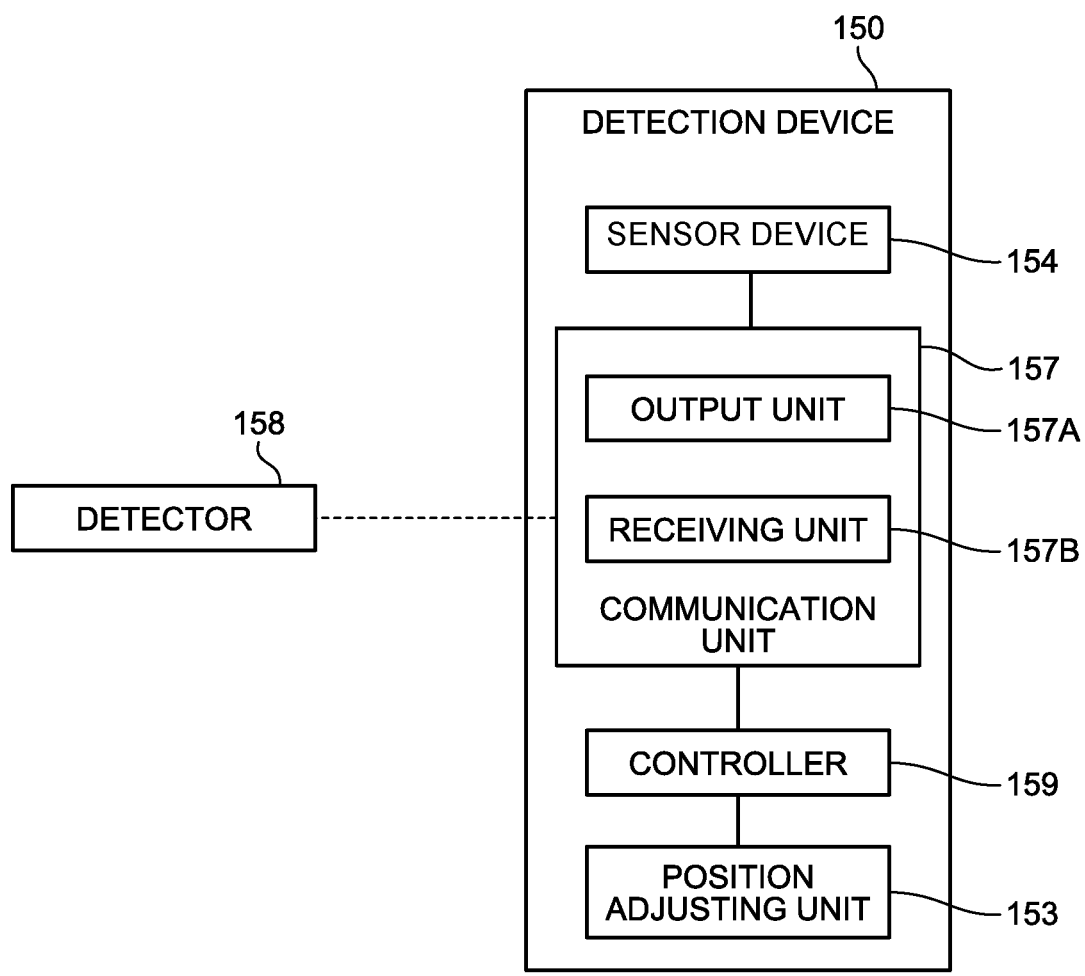
FIG. 11 is a block diagram for explaining functions of a detection device according to the second embodiment.

FIG. 11 is a block diagram for explaining functions of the detection device according to the second embodiment. As illustrated in FIG. 11, the communication unit 157 successively obtains detection results of the movement of the head HA of the rider H from the detector 158. The controller 159 controls movement of the position adjusting unit 153 in response to the detection result of the movement of the head HA of the rider H that the communication unit 157 has obtained. That is to say, the controller 159 moves the position adjusting unit 153 such that the detection direction D2 corresponds to the orientation of the head HA (orientation of the eyes) of the rider H following the movement of the head HA of the rider H. The movement of the position adjusting unit 153 changes the direction of the detection direction D2 by the sensor device 154. Accordingly, a range of the surroundings that the sensor device 154 obtains is changed. The detection device 150 according to the second embodiment can thus obtain pieces of environmental information at various positions as in the first embodiment.

While certain embodiments of the present invention have been described, the description thereof is not intended to limit the embodiments. The constituting elements described herein include elements easily achieved by one skilled in the art, elements being substantially the same as the constituting elements, and elements within the scope of equivalents of the constituting elements. The constituting elements described herein may be combined in an appropriate manner. Furthermore, various omissions, substitutions, and changes in the constituting elements may be made without departing from the spirit of the embodiments.

REFERENCE CHARACTERS LIST

10 Small vehicle
11 Main body
12 Frame
14 Front wheel
16 Rear wheel
17 Saddle
18 Handlebar
20 Crank
24 Sprocket
26 Chain
28 Battery
30 Components
32 Detector
40 Control device
50 Detection device
52 Main body
54 Sensor device
56 Attaching unit (mount)
57 Communication unit
57A Output unit
58 Detector
60 Notification device
D1 Traveling direction
D2 Detection direction
H Rider

The invention claimed is:

1. A detection device comprising:
a sensor device configured to obtain environmental information about surroundings of a human-power driving vehicle;
an output device configured to output the environmental information to a control device of the human-power driving vehicle;
a mount configured to be attached to a rider of the human-power driving vehicle so as to hold the sensor device and the output device; and
a controller configured to control the sensor device so as to change a range of the surroundings to be obtained in response to at least one of a movement of eyes of the rider of the human-power driving vehicle in a vertical direction and a movement of a head of the rider in the vertical direction, wherein
the environmental information relates to deformation of a ground surface in the vertical direction, and
the control device controls, based on the environmental information, at least one of a transmission of the human-power driving vehicle, a suspension of the human-power driving vehicle, an adjustable seat post of the human-power driving vehicle, a traveling assisting device which assists travel of the human-power driving vehicle, and a braking device of the human-power driving vehicle.

2. The detection device according to claim 1, wherein the mount is configured to be attached to a helmet or eyewear of the rider.

3. The detection device according to claim 1, wherein the sensor device obtains the environmental information by receiving an electromagnetic wave reflected by a detection object in the surroundings, and a frequency of the electromagnetic wave is equal to or more than 30 GHz.

4. The detection device according to claim 3, wherein the sensor device outputs an electromagnetic wave toward the surroundings, and receives, as the electromagnetic wave reflected by a detection object, a reflected wave of the output electromagnetic wave from the detection object.

5. The detection device according to claim 1, wherein the output device outputs the environmental information to the control device of the human-power driving vehicle via wireless communication.

6. The detection device according to claim 1, wherein the human-power driving vehicle is a saddle-type vehicle.

7. A control system comprising:
the detection device according to claim 1; and
the control device of the human-power driving vehicle.

8. The control system according to claim 7, wherein the control device includes a receiver configured to receive the environmental information from the output device via wireless communication.

9. The control system according to claim 7, further comprising a notification device, wherein
the control device controls the notification device based on the environmental information.

10. The control system according to claim 9, wherein the notification device includes at least one of a cycle computer, eyewear, a smartphone, a tablet device, a smartwatch, a personal computer, a lamp, and a speaker.

11. The control system according to claim 9, wherein the notification device outputs at least any one of sound, light, and vibration.

12. The detection device according to claim 1, wherein the environmental information about the surroundings of the human-power driving vehicle is obtained in a traveling direction of the human-power driving vehicle.

* * * * *